(12) United States Patent
Nies (10) Patent No.: US 11,460,144 B2
(45) Date of Patent: Oct. 4, 2022

(54) HIGH-TEMPERATURE INSULATION FOR THERMALLY INSULATING PIPES

(71) Applicant: Klaus-Dieter Nies, Kirchhundem (DE)

(72) Inventor: Klaus-Dieter Nies, Kirchhundem (DE)

(*) Notice: Subject to any disclaimer, the term of this patent is extended or adjusted under 35 U.S.C. 154(b) by 0 days.

(21) Appl. No.: 17/620,107

(22) PCT Filed: Jun. 22, 2020

(86) PCT No.: PCT/EP2020/067293
§ 371 (c)(1),
(2) Date: Dec. 16, 2021

(87) PCT Pub. No.: WO2020/260179
PCT Pub. Date: Dec. 30, 2020

(65) Prior Publication Data
US 2022/0205580 A1 Jun. 30, 2022

(30) Foreign Application Priority Data
Jun. 24, 2019 (DE) ...................... 20 2019 103 492.0

(51) Int. Cl.
*F16L 59/02* (2006.01)
*F16L 59/14* (2006.01)
(Continued)

(52) U.S. Cl.
CPC .............. *F16L 59/029* (2013.01); *B32B 1/08* (2013.01); *B32B 5/02* (2013.01); *B32B 7/027* (2019.01);
(Continued)

(58) Field of Classification Search
CPC ......... F16L 59/02; F16L 59/14; F16L 59/153; B32B 1/08; B32B 2597/00; B32B 2307/304
(Continued)

(56) References Cited

U.S. PATENT DOCUMENTS 2,264,967 A 12/1941 Cryor
2,826,523 A 3/1958 Blaszkowski et al.
(Continued)

FOREIGN PATENT DOCUMENTS

CA 2846478 A1 11/2012
CN 109027525 A 12/2018
(Continued)

OTHER PUBLICATIONS

Search Report from the German Patent Office (DPMA) dated Mar. 26, 2020 for related patent application DE 20 2019 103 492.0 listing references on p. 2.
(Continued)

*Primary Examiner* — Patrick F Brinson
(74) *Attorney, Agent, or Firm* — Hassan Abbas Shakir; Shakir Law PLLC (57) ABSTRACT

A high-temperature insulation for thermally insulating pipes includes a carrier layer, wound helically to form a tubular main body and has four or more windings, and has three or more different insulating layers. The inner winding circumferentially surrounds the inner cavity of the tubular main body. The circumference of the inner cavity is at least 50 mm. The insulating layers are arranged in the gaps between the windings of the carrier layer and contact the carrier layer both radially inwardly and radially outwardly. The insulating layers are arranged in the carrier layer have, along the circular path specified by the winding, a length that corresponds to at least 80% of the circumference of the inner cavity of the tubular main body. The carrier layer, the first insulating layer, the second insulating layer, and the third insulating layer each consist of different materials and/or thermal conductivities and/or temperature resistances.

10 Claims, 2 Drawing Sheets

(51) Int. Cl.
*B32B 1/08* (2006.01)
*B32B 7/027* (2019.01)
*B32B 5/02* (2006.01)
*B32B 15/20* (2006.01)
*B32B 19/04* (2006.01)
*B32B 15/08* (2006.01)
*B32B 19/06* (2006.01)
*B32B 15/18* (2006.01)

(52) U.S. Cl.
CPC .............. *B32B 15/08* (2013.01); *B32B 15/18* (2013.01); *B32B 15/20* (2013.01); *B32B 19/041* (2013.01); *B32B 19/06* (2013.01); *F16L 59/026* (2013.01); *F16L 59/145* (2013.01); *B32B 2255/02* (2013.01); *B32B 2255/26* (2013.01); *B32B 2260/021* (2013.01); *B32B 2260/04* (2013.01); *B32B 2262/101* (2013.01); *B32B 2307/302* (2013.01); *B32B 2307/304* (2013.01); *B32B 2307/732* (2013.01); *B32B 2597/00* (2013.01)

(58) Field of Classification Search
USPC ..... 138/149, 129, 152, 110; 428/36.91, 34.3
See application file for complete search history.

(56) References Cited

U.S. PATENT DOCUMENTS

| | | | | |
|---|---|---|---|---|
| 3,009,600 A * | 11/1961 | Matsch | ................ | A47J 41/022 428/212 |
| 3,980,107 A * | 9/1976 | Barnes | .................... | B32B 27/36 138/143 |
| 4,304,268 A * | 12/1981 | Gilman | ................... | B29C 53/60 156/190 |
| 4,332,401 A | 6/1982 | Stephenson et al. | | |
| 5,049,426 A * | 9/1991 | Kimura | .................. | B29C 70/56 428/319.3 |
| 5,615,711 A * | 4/1997 | Lewis | ..................... | F01N 13/08 138/131 |
| 6,387,462 B1 * | 5/2002 | Blain | ....................... | B32B 18/00 428/408 |
| 6,548,130 B1 * | 4/2003 | Corman | ................ | C23C 16/045 428/408 |
| 8,245,381 B2 * | 8/2012 | Potter | ................. | F24F 13/0263 29/458 |
| 2005/0271896 A1 * | 12/2005 | Stahn | ....................... | F16L 9/165 428/685 |
| 2014/0008086 A1 | 1/2014 | Foerg | | |
| 2015/0260329 A1 | 9/2015 | Bond et al. | | |
| 2015/0285426 A1 | 10/2015 | Shaw | | |

FOREIGN PATENT DOCUMENTS

| | | |
|---|---|---|
| DE | 2607930 A1 | 9/1977 |
| DE | 3428080 C2 | 12/1987 |
| DE | 286028 A5 | 1/1991 |
| DE | 19746091 A1 | 4/1999 |
| DE | 102013019682 A1 | 5/2015 |
| DE | 202017101498 U1 | 8/2017 |
| DE | 102017128801 A1 | 3/2019 |
| EP | 0087613 B1 | 5/1986 |
| EP | 0896184 A2 | 2/1999 |
| EP | 1279883 A2 | 1/2003 |
| EP | 2168756 A1 | 3/2010 |
| EP | 2397742 A1 | 12/2011 |
| EP | 2682662 A2 | 1/2014 |
| EP | 2947368 A1 | 11/2015 |
| EP | 2705198 B1 | 8/2016 |
| KR | 101536565 B1 | 7/2015 |
| WO | 2004091910 A1 | 10/2004 |
| WO | 2018056626 A1 | 3/2018 |

OTHER PUBLICATIONS

International Search Report prepared by the European Patent Office dated Sep. 23, 2020 in related patent application PCT/EP2020/067293, official translation provided.
Written Opinion prepared by the European Patent Office dated Sep. 23, 2020 and uploaded to WIPO Patentscope Dec. 30, 2020 in related patent application PCT/EP2020/067293, official machine translation provided.
Examination Report in related Indian patent application 202247002635 issued by the Intellectual Property Office of India and dated Jun. 27, 2022, 5 pgs.

\* cited by examiner

HIGH-TEMPERATURE INSULATION FOR THERMALLY INSULATING PIPES

BACKGROUND OF THE INVENTION

1. Field of the Invention

The present invention is directed to a high-temperature insulation for thermally insulating pipes, a method for producing a high-temperature insulation and the use of a high-temperature insulation as insulation, fireproof fire protection and/or sound insulation for pipelines for fluids and the use as inner and/or outer lining for a container and accordingly lined containers.

2. Discussion of the Related Art

It is generally known that pipes and pipeline systems in which hot fluids such as gases and liquids are carried must be shielded from the environment by means of suitable insulation in order to avoid an undesired release of thermal energy to the environment. Damping and insulating elements are already known in the prior art, some of which elements can also be used for thermally insulating pipes and which in some cases are formed from a plurality of layers of insulating material arranged one above the other.

DE 202017101498 U1 discloses, for example, corrugated heat protection hoses for use in vehicle, transport, industrial and other applications. DE 10 2017 128 801 A1 discloses an insulation element consisting of an insulating layer stack, so that a plurality of insulating layer elements can be laid at once, the insulating layer elements having a mutual edge offset which ensures an overlap in the region of the edge offset when the insulating layer elements are attached to one another. DE 102013019682 A1 discloses an insulating element for heat and/or sound insulation of pipes or pipelines, in particular chimney pipes of chimney systems, in the form of a pipe shell made of hardened mineral wool mixed with binders, the pipe shell with its inner jacket surface preferably delimiting a rotationally cylindrical cavity extending along the axis of the pipe shell for receiving the pipe to be insulated. DE 19746091 A1 discloses a multi-layer insulation in which the joints of individual layers are arranged offset over the circumference so that there is no penetrating gap that extends from the outer vacuum jacket to the pipe to be insulated and which would then have to be closed by additional parts. EP 1279883 A2 discloses a multi-layer, hose-shaped insulating material for pipelines intended for guiding fluids of higher temperature. EP 2705198 B1 discloses a thermal insulation mat, in particular for building construction, which is formed from layers arranged one above the other and held together by means of at least one seam running in the longitudinal and/or transverse direction of the mat; and a method for producing such thermal insulation mats. EP 0896184 A2 discloses an insulating jacket for fire protection, heat and structure-borne sound insulation of pipes, ducts, fittings and systems with an outer protective layer, an inner sliding layer and an at least single-layer middle layer made of insulating material. Further prior art, which illustrates the general technical background, is WO 2018056626 A1, US 2015/0285426 A1, US 2015/0260329 A1, U.S. Pat. Nos. 4,332,401 A, 2,826,523 A, DE 2607930 A1, DD286028 A5, DE 3428080 C2 and KR 101536565 B1.

In addition, rolled or wound pipe insulations and methods for their production are also known in the prior art, as disclosed, for example, in WO 2004/091910 A1 or EP 2397742 A1. EP 2168756 A1 discloses a relatively basic method for the production of tubular bodies by simultaneously rolling up two materials, wherein the flow bodies thus obtained are not high-temperature insulation for pipes, but rather the layer structures themselves are used as pipelines and the aspect of insulation is not addressed.

There is a constant need to develop already known materials further despite the their fundamentally advantageous properties. The damping and insulation elements from the prior art have often been optimized for specific applications and requirements, but are often perceived to be disadvantageous in many respects. For example, the sometimes low resistance to thermal and/or mechanical stress and the sometimes low resistance to external environmental influences, in particular moisture, are regularly perceived as particularly disadvantageous. Many of the materials known in the prior art are also simply relatively difficult to transport and simply relatively expensive to store because of the large amount of space they require. In addition, higher flexibility of the materials would regularly be desirable, enabling easier adaptation to predetermined shapes, in particular tubular shapes. The problem also often arises in the prior art that the known materials show pronounced dust generation during production or processing, which leads to pollution of the environment and can represent a health hazard for the workers involved in production or processing. In addition, the optical and haptic properties of the surface of the known materials are often perceived as inadequate and unappealing. This is particularly relevant because many of the materials known in the prior art are also simply relatively difficult to coat and coatings on them often exhibit unfavorable adhesion. However, it is regularly considered to be particularly disadvantageous that the damping or insulating effect is often simply insufficient relative to the material thickness in the prior art, so that the shielding is inadequate or particularly thick and/or heavy insulating layers must be used.

Likewise, in some cases, thermal radiation is simply insufficiently reflected by the insulation material or additional sound insulation, which is desirable in itself, cannot be effectively guaranteed. In addition, many of the materials known in the prior art are simply relatively complex and/or must be produced using expensive materials and are correspondingly expensive.

SUMMARY OF THE INVENTION

The present invention is therefore based on the primary object of eliminating or at least reducing the above-described disadvantages of the prior art. Accordingly, the present invention is based in particular on the object of specifying a particularly stable high-temperature insulation that can be effectively transported and stored and has a high degree of flexibility. A corresponding high-temperature insulation should advantageously show reduced dust generation during production and processing and should have good optical and haptic properties and good coatability. In particular, however, the object was to provide high-temperature insulation having particularly favorable insulating properties and being particularly simple, safe and inexpensive to manufacture. Accordingly, it was also an object to provide an advantageous production method and uses for corresponding high-temperature insulation and a disposal container comprising corresponding high-temperature insulation.

DETAILED DESCRIPTION OF THE INVENTION

The present invention relates in particular to a high-temperature insulation for thermally insulating pipes, comprising a carrier layer having four or more windings wound helically to form a tubular main body, and
three or more different insulating layers,
wherein the inner winding of the carrier layer circumferentially surrounds the inner cavity of the tubular main body, wherein the circumference of the inner cavity is at least 50 mm,
wherein the insulating layers are arranged in the gaps between the windings of the carrier layer and are in contact with the carrier layer both radially inwardly and radially outwardly,
wherein the insulating layers arranged in the carrier layer have, along the circular path specified in each case by the winding, a length that corresponds to at least 80% of the circumference of the inner cavity of the tubular main body, and
wherein the carrier layer, the first insulating layer, the second insulating layer and the third insulating layer each consist of different materials and/or have different thermal conductivities and/or have different temperature resistances, wherein preferably the carrier layer, the first insulating layer, the second insulating layer and the third insulating layer each consist of different materials and/or have different thermal conductivities, wherein very particularly preferably the carrier layer, the first insulating layer, the second insulating layer and the third insulating layer each have different thermal conductivities.

High-temperature insulation for thermally insulating pipes is known to the person skilled in the art. In the context of the present invention, in accordance with expert understanding, a high-temperature insulation for thermally insulating pipes is at least suitable to insulate a pipe that is more than 100° C. hot over a period of several months so that the surface temperature of the insulation is less than 60° C. at an ambient temperature of 25° C. This means that, for example, wrapping with a very thin metal foil or a coating with a non-temperature-resistant material can in principle lead to at least a low insulating effect, at least for a short time, but both designs are not viewed by the person skilled in the art as high-temperature insulation in the context of the present invention.

In the context of the present invention, the expressions wrap and roll and the expressions wound and rolled are used synonymously and both denote the process that is carried out, for example, when winding or rolling up a panel of fabric to form a roll of fabric.

The invention is explained in more detail below with reference to the figures.

Figure 1:
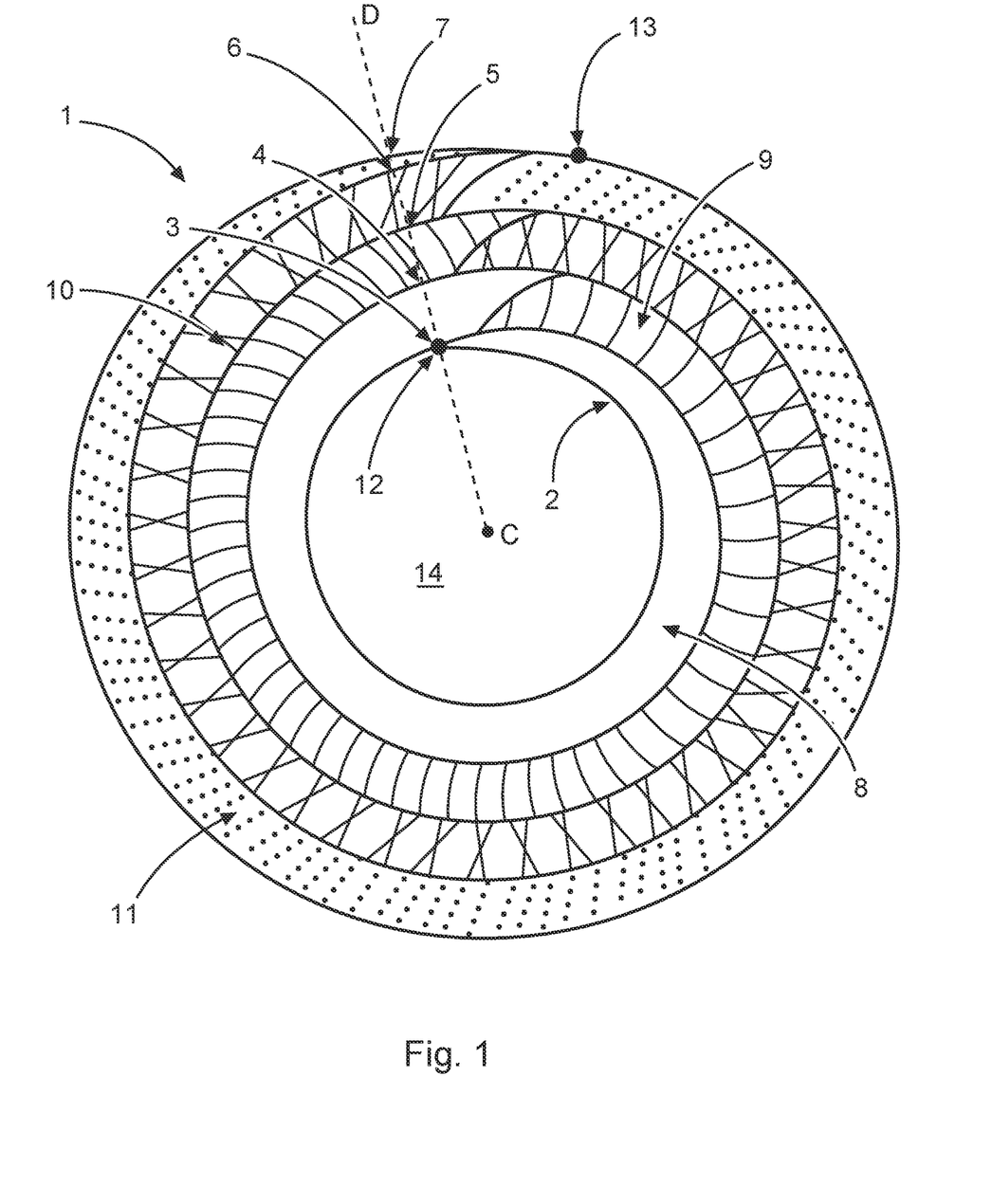
FIG. 1: The cross section through a high-temperature insulation according to the invention.

FIG. 1 shows a cross-section through a high-temperature insulation 1 according to the invention for thermally insulating pipes, comprising a carrier layer 2 having five windings wound helically to form a tubular main body, the windings always being complete when the carrier layer has reached the level of the first ring closure of the first winding 3 again during winding. Each winding is thus complete when the carrier layer intersects the auxiliary axis CD entered in FIG. 1, so that the first, second, third, fourth and fifth windings of the carrier layer in FIG. 1 are completed at the points marked 3, 4, 5, 6 and 7, respectively. The inner, that is, first, winding of the carrier layer 2 surrounds the inner cavity 14 of the tubular main body in the circumferential direction, the circumference of the inner cavity being at least 50 mm.

In the tubular main body formed by the carrier layer 2, four different insulation layers 8, 9, 10, 11 are arranged in the gaps between the windings of the carrier layer 2 in FIG. 1, which insulation layers 8, 9, 10, 11 are in contact with the carrier layer 2 radially inwardly and radially outwardly, wherein the insulating layers 8, 9, 10, 11 arranged in the carrier layer 2 have a length along the respective circular path predetermined by the winding, which length corresponds to at least 80% of the circumference of the inner cavity 14 of the tubular base body, wherein the length of the insulating layers 8, 9, 10, 11 in FIG. 1 corresponds to even more than 100% of the circumference of the inner cavity 14 of the tubular main body.

The carrier layer 2, the first insulating layer 8, the second insulating layer 9, the third insulating layer 10 and the fourth insulating layer 11 in the embodiment according to FIG. 1 each consist of different materials and have different thermal conductivities. In the preferred embodiment outlined in FIG. 1, the carrier layer 2 consists of aluminum foil, the first insulating layer 8 consists of alkaline earth silicate wool, the second insulating layer 9 consists of a mat impregnated with an $SiO_2$-based hydrophobic impregnation and additionally coated, the third insulating layer 10 consists of rock wool and the fourth insulating layer 11 consists of a mat impregnated with an $SiO_2$-based hydrophobic impregnation, which mat differs from the second insulating layer 9 in terms of its structure and thermal conductivity.

In the embodiment according to FIG. 1, the free ends of the carrier layer 2 were fastened to the carrier layer 2 both at the contact point of the first winding 3 and at the end of the winding with welding points 12, 13 in order to fix the overall structure.

Figure 2:
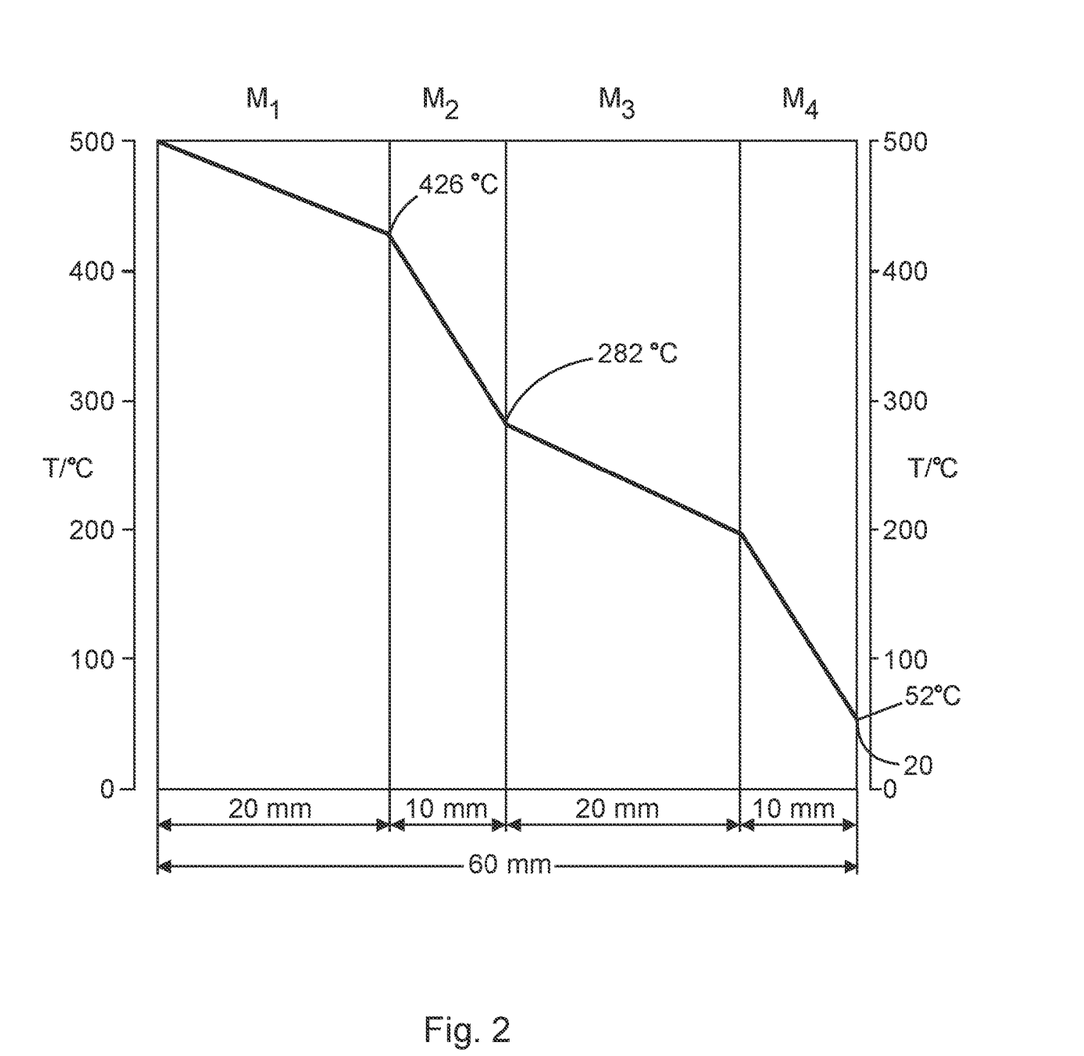
FIG. 2: A schematic, simulated temperature profile through a high-temperature insulation according to the invention.

FIG. 2 shows (only schematically) the simulated temperature profile starting from a 500° C. hot pipe (left on the x-axis) radially through the high-temperature insulation 1 according to the invention disclosed in FIG. 1, up to the surface of the high-temperature insulation 1 (right on the x-axis) having a temperature of 52° C. The regions marked with M1, M2, M3 and M4 correspond to the first, second, third and fourth insulating layers 8, 9, 10, 11 disclosed in FIG. 1. This carrier layer 2 is not shown separately in FIG. 2 due to the small thickness of the aluminum foil used.

For the person skilled in the art, the extremely favorable temperature profile and the excellent insulating performance of a high-temperature insulation according to the invention can already be clearly seen from the profile depicted in FIG. 2, which high-temperature insulation is particularly advantageous in view of the total thickness of only about 60 mm and the high availability of the materials used. In addition, however, there is also the significant contribution that the five layers of aluminum foil make by reflecting radiation in a synergistic manner. It is difficult to quantify this contribution correctly using simulations, but it is confirmed by measurements on high-temperature insulation according to the invention.

Unless otherwise stated, the values determined or calculated at 10° C. using a commercially available heat flow meter are regarded as thermal conductivity in the context of this invention. The term "temperature resistance" is familiar to the person skilled in the art, the upper temperature application limit providing information about this property. An exact measuring method does not have to be specified in the context of the present invention, since any method is equally suitable for determining differences, as long as all materials are measured under the same conditions.

In the manufacture of high-temperature insulation according to the invention, the carrier layer is first rolled into a first winding so that the inner winding of the carrier layer circumferentially surrounds the inner cavity of the later tubular main body, the circumference of the inner cavity being at least 50 mm, which is necessary for the intended uses as pipe insulation and smaller high-temperature insulations cannot be carried out reliably or economically in a manner according to the invention. In some cases, usually depending on the roll-up behavior of the carrier layer, it is preferred to fix this first winding by attaching the free end of the carrier layer to the carrier layer at the point of the ring closure of the first winding (or at the contact surface) using conventional fastening methods such as gluing, welding, riveting and/or external clamps. Accordingly, high-temperature insulation is preferred wherein the inner winding is fixed by fastening means.

The carrier layer is then rolled up together with a first insulating layer attached to the carrier layer, or more precisely the outside of the first winding of the carrier layer, until the first insulating layer has been completely rolled up. This process is continued with the second, third and every further insulating layer until the entire tubular main body or the finished high-temperature insulation is obtained. This creates a wound, tubular high-temperature insulation in which the insulating layers are arranged in the gaps between the windings of the carrier layer and are in contact with the carrier layer both radially inwardly and radially outwardly. In the side view of this wound, tubular high-temperature insulation, or in cross-section, a helical course can be seen for the carrier layer, so that the carrier layer can be referred to as helically wound, each complete revolution of the circumference being referred to as a winding. The lengths of the different insulating layers used in production are necessarily shorter than the entire carrier layer, wherein the insulating layers arranged in the carrier layer are at least long enough that they have a length in the tubular main body formed by the carrier layer along the circular path given by the winding, which length corresponds to at least 80% of the circumference of the inner cavity of the tubular main body. As a result, and due to the fact that the carrier layer, the first insulating layer, the second insulating layer and the third insulating layer, according to the invention, each consist of different materials and/or have different thermal conductivities, a multi-layer high-temperature insulation is created in which a plurality of layers of different materials are arranged one above the other in the radial direction, which layers are fixed by the helical winding of the carrier layer.

Suitable materials for the carrier layer and the insulating layers are known in principle to the person skilled in the art. It should be noted here that metal layers can in principle be viewed as insulating layers, but are not insulating layers in the context of the present invention, so that high-temperature insulation according to the invention comprises at least three different, non-metallic or not completely metallic insulating layers. According to the invention, the carrier layer and the insulating layers, that is, also each of the three insulating layers under one another, consist of different materials and/or have different thermal conductivities and/or temperature resistances. A high-temperature insulation consisting of a $SiO_2$-based carrier layer and three $SiO_2$-based insulating layers can thus be inventive, for example, although they consist of the same materials in chemical terms, provided that their material properties differ, for example, due to different material structures, or the thermal conductivities of these layers, for example, due to different porosities. The different thermal conductivity of an insulating layer can in principle also arise from the fact that two different materials are used together as an insulating layer, wherein the mean of the thermal conductivity weighted according to their proportion in the layer is used to determine whether there is a different thermal conductivity. Since the thermal conductivities of materials are always subject to a certain fluctuation due to production, differences in thermal conductivity of less than 0.5% are not understood as different thermal conductivity within the scope of the invention.

In relation to the tubular main body or the high-temperature insulation, the term inner or radially inner always means the point that is radially closer to the center of the circle described by the first winding of the carrier layer, that is, the base of the cavity in which the pipe to be insulated will later be placed is arranged.

The high-temperature insulation according to the invention is in the later application, for example, slipped or pulled onto the pipe to be insulated and, alternatively, can also be formed into a sleeve by undoing the tubular main body along the longitudinal axis, which sleeve can be wrapped around the pipe to be insulated and fastened there.

Due to the structure described above, high-temperature insulation according to the invention has numerous advantages over the prior art and is particularly efficient, simple and inexpensive to produce. The arrangement according to the invention results in particular in a stepped, unsteady course of the thermal conductivities along the radial direction through the high-temperature insulation and in a comparatively large number of material boundaries or interfaces. The high-temperature insulation according to the invention has proven to be particularly effective temperature insulation in our own tests and, compared to many insulation materials from the prior art, enables either thinner or lighter insulating layers with the same insulation effect overall or uses less expensive materials having less favorable thermal conductivity for the same thickness. Without wishing to be bound by this theory, it is assumed that this is due to the special radial temperature profile that is set when using high-temperature insulation in the structure described and in which the first derivative of the temperature according to the radius can be described by a discontinuous function. In particular, thanks to its innovative structure, the high-temperature insulation according to the invention enables the person skilled in the art to set the thermal properties of the high-temperature insulation particularly precisely and thus to manipulate the expected temperature profile in a targeted manner.

It has advantageously been shown that high-temperature insulation according to the invention also enables particularly good sound insulation, which is also attributed to the large number of material boundaries between the various materials. This is particularly beneficial for the insulation of pipes in inhabited areas.

The multi-layered arrangement of different materials makes it possible, regardless of the thermal properties of the individual layers, to easily create desirable material properties in high-temperature insulation by combining different substances and functional materials with one another, for example, to achieve particularly high fire resistance, acid resistance or cut resistance. For example, corresponding multi-layer high-temperature materials with different layers of different materials have proven to be particularly resistant to orthogonal perforation, as a result of which the insulated pipelines are additionally protected. This effect, which in a certain way can be compared with the operating principle of modern composite armor, is particularly useful for applications in which there is increased exposure to sharp particles, splinters or pressure waves that can result from explosive ignition.

A high-temperature insulation according to the invention is preferred (preferably as referred to above as preferred), comprising a carrier layer helically wound to form a tubular main body having five or more windings and four or more different insulating layers, since the advantages described above, due to the higher number of material boundaries or interfaces between the layers, are even more pronounced. In this case, the carrier layer, the first insulating layer, the second insulating layer, the third insulating layer and the fourth insulating layer each consist of different materials and/or have different thermal conductivities and/or different temperature resistances.

A high-temperature insulation according to the invention is preferred (preferably as referred to above as preferred), wherein the radially inner surface and/or the radially outer surface of the high-temperature insulation is formed by the carrier layer. Corresponding high-temperature insulation is particularly easy to manufacture, since the tubular main body can be closed particularly easily after all the insulating layers have been completely rolled up, that the carrier layer is connected to itself at a previous winding. If a soft or easily deformable carrier layer is used, this high-temperature insulation can also be particularly easily pulled onto a pipe to be insulated.

In the particularly preferred case of a metallic carrier layer, preferably as hereinafter referred to as preferred, there is also a particularly positive visual and haptic impression and, as a rule, particularly good coatability of the surface. It can also prove to be beneficial that there is a conductive electrical contact between the inner tube and the outside of the high-temperature insulation due to the continuous carrier layer running in the high-temperature insulation, for example, to avoid electrostatic charging of otherwise ungrounded components.

When using a metallic or a hydrophobically impregnated carrier layer, this embodiment results in a particularly high resistance to the effects of the weather and the penetration of moisture. In particular, the penetration of moisture into the insulation (usually outside of high-temperature operation) is regularly particularly disadvantageous for the durability of high-temperature insulation and its long-term insulating effect.

It is also particularly advantageous that when using suitable, non-dusting carrier layers, in particular metallic carrier layers, preferably as hereinafter referred to as preferred, the often particularly dusty insulating layers are shielded from the outside world by a non-dusting carrier layer, by which the pollution of the environment is minimized during the production and processing of corresponding high-temperature insulation and occupational safety is advantageously increased.

A high-temperature insulation according to the invention is preferred (preferably as referred to above as preferred), wherein the insulating layers and the carrier layer are arranged such that they can be displaced relative to one another, and/or wherein the insulating layers are only fixed by the tension between two windings of the carrier layer, and/or wherein the insulating layers and the carrier layer are not connected to one another by additional fastening means. Corresponding high-temperature insulation is particularly preferred because therein the various layers of the insulating layers are not firmly connected to the carrier layer and a particularly flexible structure which can be adapted particularly easily to a pipeline is thereby formed. In particular, this enables slight widening of the inside diameter, whereby the fastening of the high-temperature insulation is significantly facilitated. The flexible structure enables particularly easy transport and very space-saving storage. This is because the corresponding high-temperature insulation can easily be compressed by a force exerted orthogonally to the surface such that the cavity in the tubular main body is compressed so that it disappears. This optimizes the space available and minimizes the storage volume. It is particularly advantageous that such a flexible high-temperature insulation can be converted back into the tubular shape without residue after storage, without weak points remaining in the main body due to the storage, which weak points would limit the insulating effect or the durability. In addition, the machinability of the corresponding high-temperature insulation is also significantly improved, in particular when the elements are cut to size, since no seams, weld points or glue points between the layers can be undone or damaged due to the occurring mechanical stress. It is very advantageous that corresponding high-temperature insulation can also be used as an insert or inner or outer lining for containers, since said insulation can be adapted particularly easily to an outer shape or an inner core, in particular if the loose ends of the carrier layer on the inside and/or the outside of the high-temperature insulation are not or movably fixed to the carrier layer, which can be particularly preferred in these cases. According to the situation, it is particularly preferred if the free ends of the carrier layer are fixed to the carrier layer simply on the inside or simply on the outside, preferably neither on the inside nor on the outside, of the tubular main body, that is, are non-releasably connected without the action of force.

A high-temperature insulation according to the invention is preferred (preferably as referred to above as preferred), wherein the insulating layers arranged in the carrier layer have a length along the respective circular path predetermined by winding that corresponds to at least 90%, preferably at least 100%, particularly preferably at least 110%, also preferably less than 600%, particularly preferably less than 400%, very particularly preferably less than 200%, even more preferably less than 150%, of the circumference of the tubular main body. Corresponding high-temperature insulation is preferred because corresponding lengths of the insulating layers have proven to be a particularly good compromise between good insulation and good processability. A high-temperature insulation according to the invention is preferred (preferably as referred to above as preferred), wherein the insulating layers each abut one another with at least one further insulating layer, wherein the joints between the various insulating layers are preferably offset over the circumference of the tubular main body. Corresponding high-temperature insulation is preferred because no larger cavities are formed therein, but the insulation material layer in the contact region does not become uneven due to the overlapping of the insulating layers. The preferred embodiment avoids the joints (as relative weak points in the composite) being arranged in alignment, which would result in a material section that is particularly susceptible to heat transport and perforation. In the context of the present invention and in accordance with expert understanding, two layers are butt-joined when their side edges touch one another flush without the layers overlapping. Correspondingly, joints are the points at which two layers touch each other with their side edges flush without the layers overlapping.

A high-temperature insulation according to the invention is preferred (preferably as referred to above as preferred), wherein the carrier layer is formed by a plurality of individual carrier layer elements which abut or overlap with one another. Corresponding high-temperature insulation is preferred in individual cases because the segmented carrier layer, that is, the carrier layer composed of pieces of the same material, prevents heat transport or, in the case of a metallic carrier layer, also electrical conduction through the high-temperature insulation, which could otherwise be done by a solid, wrapped carrier layer past the insulation layers. The particularly preferred normal case, however, is the solid, that is, one-piece, carrier layer.

A high-temperature insulation according to the invention is preferred (preferably as referred to above as preferred), wherein the carrier layer has a thickness of 0.05 to 5.0 mm, preferably 0.05 to 3.0 mm, particularly preferably 0.05 to 1.0 mm, since these carrier layers can be processed particularly well.

A high-temperature insulation according to the invention is preferred (preferably as referred to above as preferred), wherein the carrier layer consists of a metal foil or an uncoated glass fabric film or a coated glass fabric film, preferably a metal foil or a coated glass fabric film, particularly preferably an aluminum foil, titanium foil, stainless steel foil or a coated glass fabric film, very particularly preferably an aluminum foil or a coated glass fabric film, the coating of which comprises a silicone-based lacquer and metal flakes, in particular aluminum flakes. Corresponding high-temperature insulation is preferred, since the materials have proven to be particularly suitable for the production process disclosed because of their material properties. In addition, these materials not only ensure a stable version of the insulating layers, but also make a contribution to the overall insulation effect of the high-temperature insulation, wherein metal foils in particular make a not inconsiderable contribution by reflecting radiation, which, for example, particularly beneficial adds to the insulation effect of typical insulation materials such as glass needle mat, glass wool and rock wool, so that a synergistic effect is created. Metallic carrier layers and correspondingly impregnated glass fabric films advantageously increase the weathering resistance of the high-temperature insulation. The preferred materials are particularly durable and, if visible, are particularly visually appealing. Aluminum also offers the advantage of light weight, with otherwise particularly positive properties, in particular with regard to the reflection of radiation.

A high-temperature insulation according to the invention is preferred (preferably as referred to above as preferred), wherein the carrier layer functioning as a vapor barrier or the carrier layer is perforated such that said carrier layer allows water vapor to pass through. Corresponding high-temperature insulation is preferred, since water vapor has to pass radially through the high-temperature insulation through at least four layers of the carrier layer. This makes it possible, through the formation of the carrier layer, to set very precisely whether and how much water vapor can pass through the high-temperature insulation.

A high-temperature insulation according to the invention is preferred (preferably as referred to above as preferred), wherein the insulating layers have a thickness of 0.5 to 25 mm, preferably 1 to 12 mm, since said insulating layers can be processed particularly well and simultaneously regularly develop a sufficient insulating effect in a high-temperature insulation according to the invention.

A high-temperature insulation according to the invention is preferred (preferably as referred to above as preferred), wherein at least one, preferably at least two, particularly preferably at least three of the insulating layers consists of two or more different materials, wherein one of the materials is preferably a mica film and/or a prepreg film and/or a plastic film which develops an adhesive effect when heated, very particularly preferably a plastic film which develops an adhesive effect when heated. Corresponding high-temperature insulation is preferred because the corresponding films are located inside the high-temperature insulation and the mica film, for example, ensures particularly good fire protection. Embodiments are emphatically preferred in which there is a plastic film in the high-temperature insulation that develops an adhesive effect when heated. This high-temperature insulation is initially flexible and malleable (having the advantages described above) but can be stiffened from the inside by heat treatment and subsequent hardening of the plastic and possibly even fixed in certain shapes or geometries. This innovative concept improves and facilitates processability considerably and creates numerous new application possibilities.

A high-temperature insulation according to the invention is preferred (preferably as referred to above as preferred), wherein at least one, preferably at least two, particularly preferably at least three of the insulating layers comprise a combustible or non-combustible, preferably non-combustible, material which is inorganic or organic, preferably inorganic, wherein the material is particularly preferably a mineral wool mat, and/or wherein at least one, preferably at least two, particularly preferably at least three of the insulating layers comprise a hybrid material, preferably a hydrophobically impregnated mat, particularly preferably a mat impregnated with an $SiO_2$-based hydrophobic impregnation. Corresponding high-temperature insulation is preferred because said insulating layers are particularly proven materials having good processing properties and a good insulation effect, so that corresponding high-temperature insulation is often superior to other insulation using other materials in terms of their insulation effect.

A high-temperature insulation according to the invention is preferred (preferably as referred to above as preferred), wherein the thermal conductivity of the individual insulating layers decreases radially from the outside inwards in comparison to one another or alternates between higher and lower thermal conductivities and/or wherein the temperature resistance of the individual insulation layers decreases radially from the outside inwards in comparison to one another or alternates between higher and lower temperature resistance. Corresponding high-temperature insulation is preferred because the internal insulating layers are in contact with the hot pipe and are therefore exposed to the highest temperatures, so that low thermal conductivity and high temperature resistance in the inner insulation layers are particularly effective in insulating and also lead to high resistance. The embodiment having alternating thermal conductivities is very particularly preferred. In this preferred arrangement, the profile of the thermal conductivity along the radial direction and thus the first derivative of the temperature according to the radius have a particularly uneven course and particularly sharp jumps, which surprisingly has shown that this is apparently particularly favorable for the performance of the high-temperature insulation.

A high-temperature insulation according to the invention is preferred (preferably as referred to above as preferred), wherein the high-temperature insulation, when the inner surface is exposed for twenty four hours to a temperature in the range from 90 to 1000° C., preferably in the range from 100 to 400° C., particularly preferably in the range of 130 to 300° C. and an ambient temperature of 25° C., has a temperature of 30 to 85° C., preferably 35 to 50° C., particularly preferably 40 to 45° C. on the outer surface, wherein the temperature of the outer surface very particularly preferably remains below 60° C. Corresponding high-temperature insulation is preferred because it has been optimized for the specific requirements which occur in the insulation of above-ground and/or underground and/or undersea pipelines for fluids having a temperature of more than 100° C., preferably more than 200° C. A lower insulating effect would be regarded as inadequate in practice. A further insulating effect of the high-temperature insulation would, however, also be less favorable, since our own calculations have shown that this is regularly uneconomical in terms of material requirements and production costs for the usually very extensive pipeline systems and is also not necessary in many cases.

A high-temperature insulation according to the invention is preferred (preferably as referred to above as preferred), additionally comprising a sheathing of the tubular main body, preferably consisting of a plastic, particularly preferably a thermosetting or thermoplastic plastic or plastic foam, very particularly preferably consisting of a plastic selected from the group consisting of made of polyurethane, PET, melamine resins, epoxies, phenolic resins, thermoplastic elastomers and nitrile rubber and/or a mica film and/or plastic film arranged on the surface of the tubular main body. Corresponding high-temperature insulation is preferred because it allows the surface properties of the high-temperature insulation to be adapted very precisely to the requirements of a specific application. For example, particularly advantageous fire protection properties can be achieved by sheathing with mica foil, whereas a polyurethane sheathing, for example, makes a further contribution to insulation and simultaneously protects the high-temperature insulation against external influences, for example, mechanical stress.

A high-temperature insulation according to the invention is preferred (preferably as referred to above as preferred), wherein the tubular main body is fixed by fastening the end of the carrier layer to the radially outer side of a previous winding of the carrier layer, and/or wherein the end faces of the tubular main body are lined with a sealing panel, wherein the sealing panel preferably consists of the same material as the carrier layer and/or of a highly compressible material having a density of 10-200 kg/m$^3$, preferably 40-130 kg/m$^3$. Corresponding high-temperature insulation is preferred because these measures lead to a particular stability of the layer composite and make a major contribution to protecting the internal parts of the high-temperature insulation from the effects of weather. This design, which is regularly perceived as particularly visually appealing, also enables particularly safe processing of the high-temperature insulation, as it prevents workers from coming into contact with the insulating layers, which would otherwise be a major challenge for occupational safety, for example, due to the development of dust. The use of a highly compressible material as a sealing panel is particularly advantageous because the advantages described above in the storage of the high-temperature insulation are retained particularly well, since the sealing panel can also be compressed for storage without impairing the structure of the high-temperature insulation in later use.

A high-temperature insulation according to the invention is preferred (preferably as referred to above as preferred), wherein the high-temperature insulation is designed such that it can be placed as a sleeve around a pipe and attached thereto. Corresponding high-temperature insulation is particularly preferred because the attachment in the form of a sleeve is not only a particularly economical and quick method of attaching high-temperature insulation, but is also particularly simple so that it can also be easily attached by poorly trained and/or equipped workers, for example, in structurally weak regions. It is particularly advantageous that, despite initial reservations, it has surprisingly been shown that high-temperature insulation according to the invention can be designed without any problems such that it can be placed as a sleeve around a pipe and attached thereto. For this purpose, the person skilled in the art only has to undo the tubular main body along the axial direction (longitudinal direction), wherein this work step can be carried out with customary tools. An additional fixation of the layer structure at the now free ends on the cutting line is usually not necessary, but can be advantageous, in particular if additional closure elements are attached to the high-temperature insulation anyway, with which the sleeve can later be closed.

The invention also relates to a method for producing a high-temperature insulation for thermally insulating pipes, preferably a high-temperature insulation according to the invention, particularly preferably as referred to above as preferred, comprising the steps:

A providing a web-shaped carrier layer,

B rolling up or winding up the carrier layer to produce a first winding,

C. Providing a first web-shaped insulating layer on the inside of the carrier layer and fixing the end of the first insulating layer between the two layers of the carrier layer at the contact point of the first winding, D. rolling up or winding up the carrier layer to produce further windings until the entire length of the first web-shaped insulating layer has been rolled up together with the carrier layer, E. providing a second web-shaped insulating layer on the inside of the carrier layer and applying said insulating layer to abut or overlap with the first web-shaped insulating layer, F. rolling up or winding up the carrier layer to produce further windings until the entire length of the second web-shaped insulating layer has been rolled up together with the carrier layer, G. providing a third web-shaped insulating layer on the inside of the carrier layer and applying said insulating layer to abut or overlap with the second web-shaped insulating layer, H. rolling up or winding up the carrier layer to produce further windings until the entire length of the third web-shaped insulating layer has been rolled up together with the carrier layer, wherein the web-shaped insulating layers each have a length which corresponds to at least 80% of the circumference of the first winding, and wherein the carrier layer, the first insulating layer, the second insulating layer and the third insulating layer each consist of different materials and/or have different thermal conductivities and/or have different temperature resistances.

This method is advantageous because it can be carried out in a particularly simple manner, has only low equipment requirements and leads to particularly efficient and advantageous products. In the light of the above disclosure and with knowledge of the invention, the person skilled in the art can reliably adapt the winding methods known in the prior art for materials, as disclosed, for example, in EP 2168756 A1, to the method according to the invention.

The first winding of the carrier layer can, in some cases, depending on the roll-up behavior of the carrier layer, preferably be fixed in that the free end of the carrier layer is fastened to the carrier layer at the point of the ring closure of the first winding by conventional fastening methods, for example gluing, welding, riveting and/or external clamps. Correspondingly, methods are preferred in which the first winding has been fixed by fastening means.

In the context of the present invention, the provision of a web-shaped layer also comprises the production of a web-shaped layer in the course of the method, for example, if a later hybrid material is not impregnated or hardened until during the method. In the context of the present invention, the inside of the carrier layer is the side that points radially inward on the tubular main body when the rolling-up process is continued.

The end of the first insulating layer between the two layers of the carrier layer at the contact point of the first winding can be fixed using conventional fastening means, but preferably takes place by clamping the first insulating layer between the two layers of the carrier layer in the tapering free space at the contact point of the first winding of the carrier layer.

A method according to the invention is preferred, preferably as referred to above as preferred, additionally comprising the step:

R. fastening the carrier layer to the radially outer side of a previous winding of the carrier layer and separating the tubular main body from the web-shaped carrier layer.

Corresponding methods are particularly preferred because it has been shown that correspondingly fixed tubular base bodies can be detached particularly easily and thoroughly from the remaining parts of the web-shaped carrier layer without this work step leading to unwanted unrolling of the wound tubular main body.

A method according to the invention is preferred, (preferably as referred to above as preferred), additionally comprising the step:

S. undoing the produced high-temperature insulation using a separating tool for producing a sleeve-shaped high-temperature insulation.

Corresponding methods are particularly preferred because the attachment of high-temperature insulation in the form of a sleeve, as explained above, is particularly advantageous and the high-temperature insulation can be designed using the preferred method completely without problems so that it is placed as a sleeve around a pipe and can be attached thereto.

It is readily apparent to the person skilled in the art that very particularly preferred methods relate to the production of preferred high-temperature insulation according to the invention, so that the features referred to above as preferred for high-temperature insulation according to the invention also apply to preferred methods according to the invention, whereby particularly advantageous products are advantageously produced, each of which has the advantages over the prior art described above.

A person skilled in the art recognizes in the light of the above statements regarding high-temperature insulation according to the invention and its numerous advantages that the invention also relates to advantageous uses of high-temperature insulation according to the invention.

The invention relates, for example, to the use of a high-temperature insulation according to the invention, preferably as referred to above as preferred, as insulation for above-ground and/or underground and/or undersea pipelines for fluids having a temperature of more than 50° C., preferably more than 100° C., particularly preferably more than 200° C. The invention also relates to the use of a high-temperature insulation according to the invention, preferably as referred to above as preferred, as fireproof fire protection and/or as sound insulation for above-ground pipelines for highly flammable and extremely flammable fluids.

Since high-temperature insulation according to the invention can be adapted particularly easily as inner or outer lining to the inner or outer contours of a container and, in addition to effective temperature insulation, regularly also has excellent fire protection properties, high resistance to mechanical perforation (due to the layer structure) and high chemical resistance (due to the use of chemically different materials in the layer structure, having a wide range of resistance), high-temperature insulation according to the invention is predestined for applications in the waste management industry, in particular for the storage and/or disposal of materials that are problematic from a safety point of view.

Accordingly, the invention particularly also relates to the use of a high-temperature insulation according to the invention, preferably as referred to above as preferred, as inner and/or outer lining, preferably as inner lining, for a container, preferably a storage, disposal or waste container, particularly preferably a waste container for batteries and accumulators, in particular for lithium-ion accumulators. Through this use, high-grade resistant containers can advantageously be obtained from ordinary containers quickly, easily and cost-effectively, which containers are suitable for the storage and/or disposal of batteries and accumulators, in particular used batteries and accumulators, or other hazardous waste.

The person skilled in the art recognizes that the invention accordingly also relates to a disposal container for storing batteries and accumulators, in particular lithium-ion accumulators, comprising a container, preferably made of plastic and/or metal, comprising a base and side walls surrounding the base, preferably a circular base and cylindrical side walls, wherein the inside and/or the outside, preferably the inside, of the side walls is covered at least partially, preferably more than 50%, particularly preferably more than 75%, very particularly preferably completely, by a high-temperature insulation according to the invention, preferably as referred to above as preferred, so that the high-temperature insulation functions as an inner and/or outer lining of the side walls of the container.

A disposal container according to the invention is preferred (preferably as referred to above as preferred), wherein the high-temperature insulation according to the invention is fixed to the side walls by fastening means or wherein the high-temperature insulation is held in the shape of the inner or outer contour of the container by a hardened plastic inside the high-temperature insulation.

Also disclosed is a method of producing a flat, high temperature insulating body for spreading over a surface, comprising the steps:

U. producing or providing a high-temperature insulation according to the invention, preferably as referred to above as preferred, preferably producing by means of a method according to the invention, preferably as referred to above as preferred, V. undoing the high-temperature insulation along the longitudinal axis using a separating tool for producing an undone high-temperature insulating body, an W. spreading and smoothing of the undone high-temperature insulating body to produce a flat high-temperature insulating body for spreading over a surface.

The undone high-temperature insulating body obtained using this method cannot be adequately defined by features, since its structure and layering largely depends on the point at which the high-temperature insulation according to the invention is undone during the production of the flat high-temperature insulating body. Correspondingly, a flat high-temperature insulating body is disclosed which was produced using the method specified above and/or can be produced using the method specified above.

The use of a flat high-temperature insulating body as fire protection for spreading on an essentially flat surface and as thermal insulation for ventilation systems and thermal treatment systems is also disclosed.

What is claimed is:

1. A high-temperature insulation for thermally insulating pipes, comprising
    a carrier layer having four or more windings wound helically to form a tubular main body, and
    three or more different insulating layers,
    the inner winding of the carrier layer circumferentially surrounding the inner cavity of the tubular main body, the circumference of the inner cavity being at least 50 mm,
    the insulating layers being arranged in the gaps between the windings of the carrier layer and being in contact with the carrier layer both radially inwardly and radially outwardly,
    the insulating layers arranged in the carrier layer having, along the circular path specified in each case by the winding, a length that corresponds to at least 80% of the circumference of the inner cavity of the tubular main body, and
    the carrier layer, the first insulating layer, the second insulating layer and the third insulating layer each consisting of different materials or having different thermal conductivities or having different temperature resistances.

2. The high-temperature insulation according to claim 1, wherein the radially inner surface or the radially outer surface of the high-temperature insulation is formed by the carrier layer.

3. The high-temperature insulation according to claim 1, wherein the insulating layers and the carrier layer are arranged to be displaceable relative to one another, or wherein the insulating layers are fixed only by the tension between two windings of the carrier layer.

4. The high-temperature insulation according to claim 3, wherein the insulating layers each abut against one another with at least one further insulating layer,
    wherein the joints between the various insulating layers are arranged offset over the circumference of the tubular main body, or wherein the carrier layer is formed by a plurality of individual carrier layer elements which abut or overlap one another.

5. The high-temperature insulation according to claim 4, wherein the carrier layer consists of a metal foil or an uncoated glass fabric film or a coated glass fabric film, or a metal foil or a coated glass fabric film, or an aluminum foil, titanium foil, stainless steel foil or a coated glass fabric film, very or of an aluminum foil or a coated glass fabric film, the coating of which comprises a silicone-based lacquer and metal flakes, in aluminum flakes.

6. The high-temperature insulation according to claim 5, wherein at least one, or at least two, or at least three of the insulating layers consist of two or more different materials, wherein one of the materials is or a mica film and/or a prepreg film or a plastic film that develops an adhesive effect when heated, or a plastic film that develops an adhesive effect when heated, or
    wherein at least one, or at least two, or at least three of the insulating layers comprise a hybrid material, or a hydrophobically impregnated mat, or a mat impregnated with an $SiO_2$-based hydrophobic impregnation.

7. The high-temperature insulation according to claim 6, wherein the thermal conductivity of the individual insulting layers deceases radially from the outside inwards in comparison to one another or alternates between higher and lower thermal conductivities, or
    wherein the high-temperature insulation, when the inner surface is exposed for twenty four hours to a temperature in the range from 90 to 1000° C., or in the range from 100 to 400° C., or in the range of 130 to 300° C. and an ambient temperature of 25° C., has a temperature of 30 to 85° C., or 35 to 50° C., or 40 to 45° C. on the outer surface, wherein the temperature of the outer surface or remains below 60° C.

8. The high-temperature insulation according to claim 7, additionally comprising a mica film or plastic film arranged on the surface of the tubular main body.

9. The high-temperature insulation according to claim 8, wherein the tubular main body is fixed by fastening the end of the carrier layer to the radially outer side of a preceding winding of the carrier layer, or
    wherein the end faces of the tubular main body are lined with a sealing panel,
    wherein the sealing panel or consists of the same material as the carrier layer or of a highly compressible material having a density of 10-200 kg/m³, or 40-130 kg/m³.

10. The high-temperature insulation according to claim 9, wherein the high-temperature insulation is designed such that it can be placed as a sleeve around a pipe and fastened thereto.

* * * * *